(12) United States Patent
Miller et al.

(10) Patent No.: US 11,181,065 B2
(45) Date of Patent: **\*Nov. 23, 2021**

(54) STANDBY GENERATOR AND CONTROLS FOR GENERATOR EXERCISE CYCLE

(71) Applicant: Briggs & Stratton, LLC, Wauwatosa, WI (US)

(72) Inventors: Mike Miller, Wauwatosa, WI (US); Dean Weigand, Waukesha, WI (US); Robert Townsend, Delafield, WI (US); Richard Jungmann, Richfield, WI (US); Todd Plichta, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/775,165

(22) Filed: Jan. 28, 2020

(65) Prior Publication Data

US 2020/0165997 A1 May 28, 2020

Related U.S. Application Data

(63) Continuation of application No. 15/723,038, filed on Oct. 2, 2017, now Pat. No. 10,584,656.

(60) Provisional application No. 62/403,588, filed on Oct. 3, 2016.

(51) Int. Cl.
| | | |
|---|---|---|
| F02D 29/06 | (2006.01) | |
| F02D 11/00 | (2006.01) | |
| G05B 15/02 | (2006.01) | |
| F02D 41/22 | (2006.01) | |
| F02N 11/00 | (2006.01) | |
| F02D 41/26 | (2006.01) | |
| F02D 41/02 | (2006.01) | |

(52) U.S. Cl.
CPC .......... F02D 41/221 (2013.01); F02D 29/06 (2013.01); F02N 11/003 (2013.01); G05B 15/02 (2013.01); F02D 41/021 (2013.01); F02D 41/26 (2013.01); F02D 2041/228 (2013.01); F02D 2200/021 (2013.01); F02D 2200/503 (2013.01); F02N 2200/061 (2013.01); F02N 2300/2002 (2013.01); Y02T 10/40 (2013.01)

(58) Field of Classification Search
CPC ......... F02D 2041/228; F02D 2200/021; F02D 2200/503; F02D 29/06; F02D 41/021; F02D 41/221; F02D 41/26; F02N 11/003; F02N 2200/061; F02N 2300/2002; G05B 15/02; Y02T 10/40
USPC ...................................................... 702/130
See application file for complete search history.

(56) References Cited

U.S. PATENT DOCUMENTS

| | | |
|---|---|---|
| 6,555,927 B1 | 4/2003 | Suzuki et al. |
| 7,230,345 B2 | 6/2007 | Winnie et al. |
| 9,109,565 B2 | 8/2015 | White et al. |
| 9,397,598 B2 | 7/2016 | White et al. |

(Continued)

*Primary Examiner* — John H Le
(74) *Attorney, Agent, or Firm* — Foley & Lardner LLP

(57) ABSTRACT

A method of exercising a generator includes detecting a temperature of the generator by a temperature sensor, if the temperature of the generator is above a predetermined temperature, activating, by a controller, a starter motor of the generator, and performing, by the controller, an exercise test, and if the temperature of the generator is below the predetermined temperature, not activating, by the controller, the starter motor.

20 Claims, 4 Drawing Sheets

(56) References Cited

U.S. PATENT DOCUMENTS

| | | | |
|---|---|---|---|
| 10,584,656 B2 * | 3/2020 | Weigand | ................ G05B 15/02 |
| 2016/0322923 A1 | 11/2016 | White et al. | |
| 2017/0113674 A1 | 4/2017 | Miyamoto et al. | |
| 2017/0211535 A1 | 7/2017 | Priem et al. | |

* cited by examiner

US 11,181,065 B2

STANDBY GENERATOR AND CONTROLS FOR GENERATOR EXERCISE CYCLE

CROSS-REFERENCE TO RELATED PATENT APPLICATIONS

This application is a continuation of U.S. application Ser. No. 15/723,038, filed Oct. 2, 2017, which claims the benefit of U.S. Application No. 62/403,588, filed Oct. 3, 2016, all which are incorporated herein by reference in its entirety.

BACKGROUND

The present disclosure generally relates to standby generators and, more particularly, to controls for generator exercise cycles.

SUMMARY

One embodiment of the present disclosure relates to a method of performing an alternate exercise cycle for a generator. The method includes detecting a temperature of the generator by a temperature sensor, if the temperature of the generator is above a predetermined temperature, activating, by a controller, a starter motor of the generator, and performing, by the controller, an exercise test, and if the temperature of the generator is below the predetermined temperature, not activating, by the controller, the starter motor.

Another embodiment of the present disclosure relates to a method of performing an alternate exercise cycle for a generator. The method includes detecting a temperature of the generator by a temperature sensor, if the temperature of the generator is below a first predetermined temperature, not activating, by the controller, the starter motor, if the temperature of the generator is above a second predetermined temperature, activating, by a controller, a starter motor and starting an engine of the generator, and performing, by the controller, a first exercise test, and if the temperature of the generator is above the first predetermined temperature and below the second predetermined temperature, activating, by the controller, the starter motor without starting the engine, and performing, by the controller, a second exercise test.

Another embodiment of the present disclosure relates to a generator including an engine including a crankshaft, a fuel valve configured to control a flow of fuel to the engine, a starter motor configured to rotate the crankshaft, an alternator driven by the engine, a temperature sensor, and a controller. The controller is programmed to read the temperature sensor, if a temperature reading of the generator is above a predetermined temperature reading, actuating the starter motor and perform a test and if the temperature reading of the generator is below the predetermined temperature reading, not actuating the starter motor.

It is to be understood that both the foregoing general description and the following detailed description are exemplary and explanatory only, and are not restrictive of the invention as claimed.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Standby generators typically include internal combustion engines. Internal combustion engines can operate using a variety of different fuel sources including liquid propane, natural gas, gasoline, diesel, etc. In general, standby generators are connected to an application site and to a surrounding power grid. In the event of a loss of electrical power from the surrounding power grid, a standby generator is designed to turn on and provide a certain amount of electrical power to the application site. To be prepared for power outages, standby generators typically run through a routine "exercise cycle" multiple times throughout the life of the standby generator to test operation of the standby generator. For certain generators, these exercise cycles can occur as often as multiple times per week. It is during these exercise cycles that individuals often become aware of the noise, fuel consumption, and other implications involved with owning and maintaining a standby generator. Frequent exercise cycles are often unnecessary for the routine maintenance of the standby generator. Reducing the number of exercise cycles and/or only cranking the engine instead of fully starting the engine can help to reduce the noise, fuel consumption, and fuel emissions resulting from the performance of exercise cycles. As such, reducing the number of exercise cycles during the life of a standby generator can not only reduce any nuisance resulting from noise of the generator, but is also more environmentally friendly.

Figure 1:
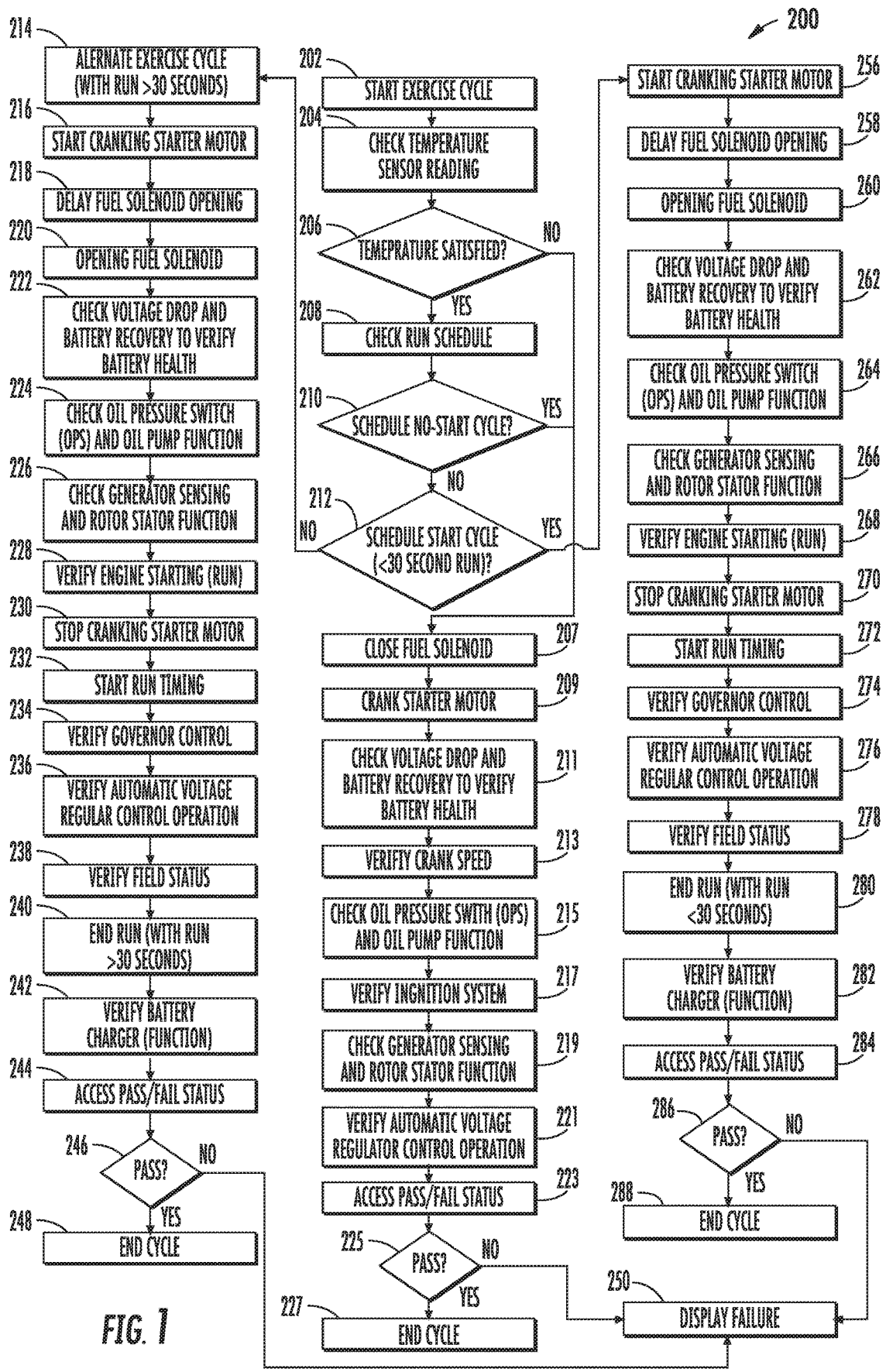
FIG. 1 is a flow diagram of an alternate exercise cycle process for a generator, according to an exemplary embodiment.

Referring to FIG. 1, a flow diagram of a process for running an alternate exercise cycle is shown according to an exemplary embodiment. The process 200 includes at least three possible cycles. Process 200 includes a no-start exercise cycle where the engine is not started, a short-run exercise cycle where the engine is started for a short period of time (e.g., less than 30 seconds), and an alternate exercise cycle, where the engine is started for a relatively longer period of time (e.g., more than 30 seconds). The selected cycle is determined in part by the temperature sensor reading and in part by an exercise schedule. The individual tests performed during the various exercise cycles can be ordered differently than described in the exemplary embodiment set forth below.

At process 202, the exercise cycle is started. The temperature sensor reading is checked at 204. The temperature reading is checked using a temperature sensor, as described further herein. If the temperature reading is not satisfied (e.g., below a certain temperature, for example, below 40 degrees Fahrenheit (° F.) (4.444 degrees Celsius (° C.)), the generator proceeds with a no-start exercise cycle (shown in FIG. 1 as processes 207 through 227).

At process 207, the fuel solenoid is closed. The fuel solenoid is closed so that the starter motor can be activated or cranked without starting the engine. Next, at 209, the starter motor is cranked. At 211, the voltage drop and battery health are checked to verify the battery health. A voltage reading is taken before and after cranking to determine the effect of cranking the starter motor on the voltage. Voltage drops between the readings can indicate the generator needs maintenance. The voltage reading additionally tests the recovery of the battery to determine battery health. At 213, the crank speed is verified. An engine speed sensor is used to determine the crank speed. At 215, the oil pressure switch (OPS) and the oil pump function are checked. A pressure reading can be used to check that sufficient oil pressure in the lubricant system is being produced by the oil pump. The pressure value can be read without starting the engine. In some cases, the crank time needs to exceed a certain amount of time (e.g., greater than 5 seconds) for the oil pump to build up sufficient pressure to actuate the OPS. At 217, the ignition system is verified. At 219, the generator sensing and rotor stator function are checked. A voltage reading can be used to check rotor/stator function and generator sensing. At 221, the automatic voltage regulator control operation is verified. The voltage reading can be used to determine the health of the voltage regulator, which is used to automatically maintain a constant output voltage level. At 223, a pass/fail status is generated for the exercise cycle. If the generator has passed the exercise cycle and all associated checks, the cycle is ended at 227. If the generator has failed any of the checks during the exercise cycle, the failure notification is displayed at 250.

If the temperature reading is satisfied (e.g., above a certain temperature, for example, 40° F. (4.444° C.)), the process continues to check the run schedule at 208. If a no-start exercise cycle is scheduled at 210, the generator proceeds to run a no-start exercise cycle, described above with reference to processes 207 through 227. If a no-start exercise cycle is not scheduled at 210, the system checks whether an alternate exercise cycle is scheduled at 212. If an alternate exercise cycle is not scheduled (e.g., an engine run less than 30 seconds is scheduled), the system proceeds with a short-run exercise cycle, as described further herein in regard to processes 256 through 288. If an alternate exercise cycle is scheduled (e.g., an engine run longer than 30 seconds is scheduled), the system proceeds with an alternate exercise cycle for the generator, as described further herein in regard to processes 216 through 248.

At process 256, the starter motor is cranked. Opening of the fuel solenoid is delayed for a set time period at 258 and is opened at 260. The voltage drop and battery recovery is checked to verify the battery health at 262. The OPS and oil pump function is checked at 264. Next, the generator sensing and rotor stator function are checked at 266. The system then verifies that the engine has started at 268 by monitoring engine speed or other indicators of engine operation and then deactivates or stops cranking the starter motor at 270. The system starts run timing at 272. At 274, the governor control is verified by monitoring engine speed. At 276, the automatic voltage regulator control operation is verified and at 278, the field status is verified. The engine is stopped at 280. Next, the battery charger function is verified at 282 and a pass/fail status is generated for the exercise cycle at 284. If the generator has passed the exercise cycle and all associated checks at 286, the cycle is ended at 288. If the generator has failed any of the checks during the exercise cycle at 286, the failure notification is displayed at 250.

The same checks and verifications are done during the alternate exercise cycle (processes 214-248) as during the short-run cycle (processes 256-288) described above except that the engine is run for a relatively longer period of time (e.g., greater than 30 seconds) during the alternate exercise cycle.

Figure 2:
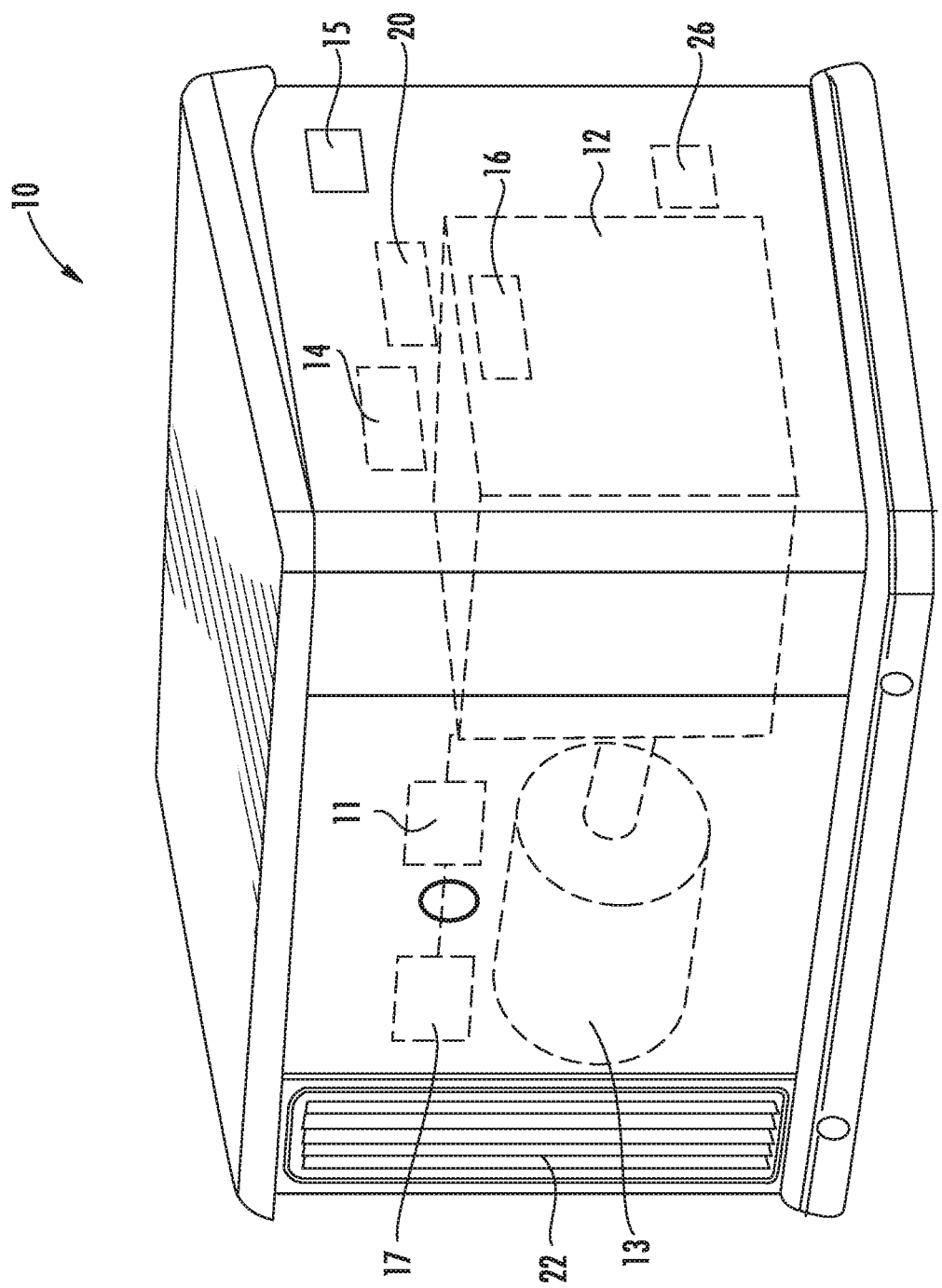
FIG. 2 is a schematic diagram of a generator, according to an exemplary embodiment.

Referring to FIG. 2, a generator is shown according to an exemplary embodiment. The generator 10 includes an engine 12, including a starter motor 11, air/fuel mixing device 14, governor 16, throttle 20, air intake 22, exhaust outlet 26, and an alternator 13 driven by the engine 12. The starter motor 11 rotates a crankshaft to start the engine 12. In some embodiments, the starter motor 11 can be used to crank the engine without allowing the engine 12 to reach starting speeds (e.g., greater than 350 revolutions per minute (RPM)). The alternator 13 produces electrical power from input mechanical power from the engine 12. The alternator 13 charges a battery 17, which stores energy for use by the electrical systems of the generator. The generator 10 additionally includes one or more outputs 15 for supply of the generated electrical power to an electrical device of a user's choosing. Air flows into the engine 12 from the air intake 22 and through the air/fuel mixing device 14. As air passes through the air/fuel mixing device 14, the air mixes with fuel entering the air/fuel mixing device 14 and creates an air/fuel mixture that then enters the engine 12. The throttle 20 controls the flow of the air/fuel mixture that exits the air/fuel mixing device 14. The governor 16 controls the position of the throttle 20 based on a detected load on the engine 12. In one embodiment, the governor 16 is an electronic governor. In another embodiment, the governor 16 is a mechanical governor. The air/fuel mixture leaving the air/fuel mixing device 14 is combusted in one or more cylinders of the engine 12 and exhaust gas from combustion leaves the engine 12 through the exhaust outlet 26. In one embodiment, the air/fuel mixing device includes an electronic fuel injection (EFI) system. In another embodiment, the air/fuel mixing device includes a carburetor.

Figure 3:
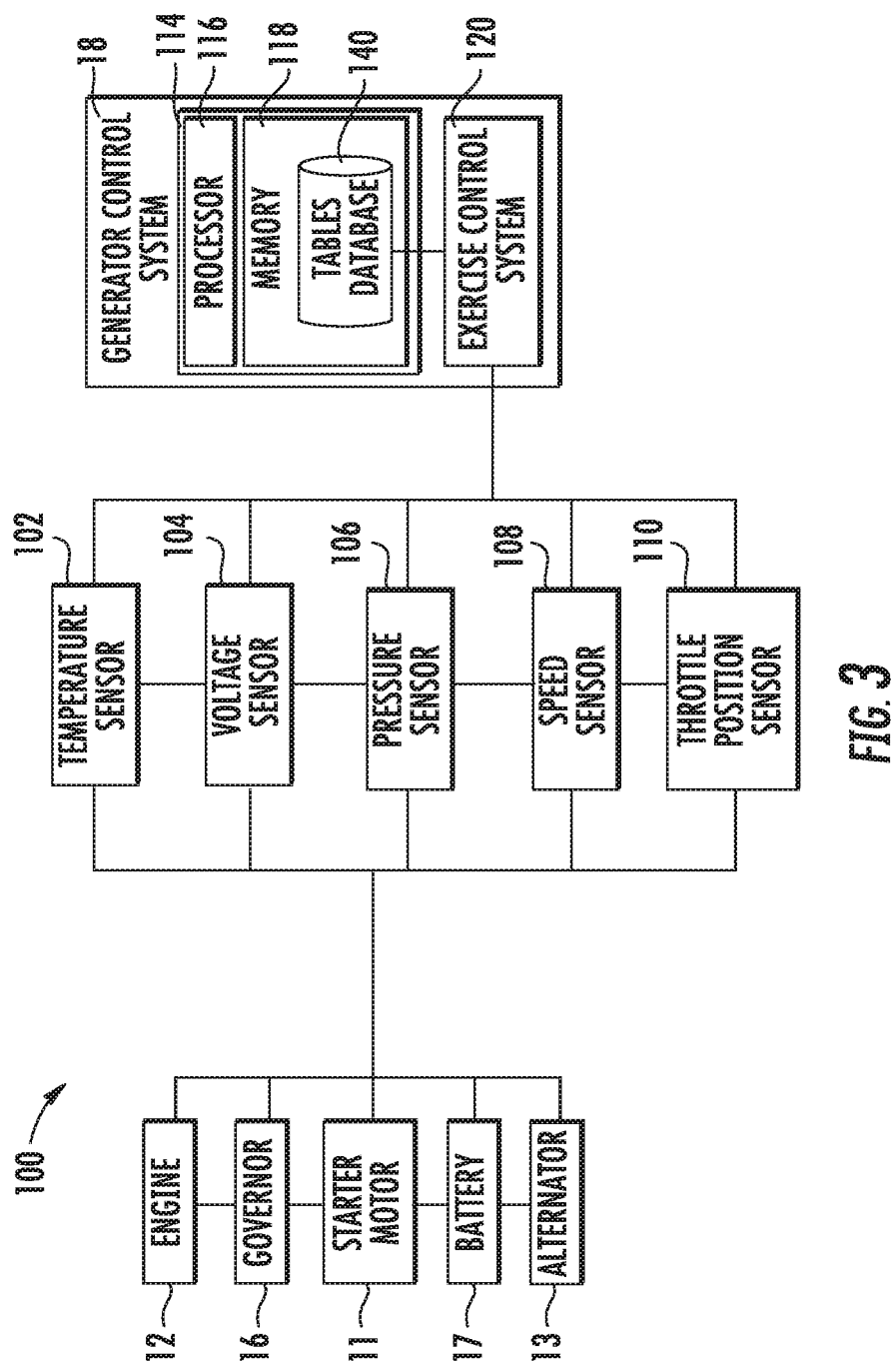
FIG. 3 is a schematic diagram of an exercise cycle management system, according to an exemplary embodiment.

Referring to FIG. 3, an exercise cycle management system for a generator 10 is illustrated according to an exemplary embodiment. The exercise cycle management system 100 additionally an exercise control system 120, a temperature sensor 102, a voltage sensor 104, a pressure sensor 106, a speed sensor 108, and a throttle position sensor 110, all communicably and operatively coupled to the exercise control system 120. In some embodiments, the exercise cycle management system 100 includes more or less sensors than are shown in FIG. 2. As shown, the exercise cycle management system 100 includes a generator control system 18, which includes and operates the exercise control system 120.

The temperature sensor 102 is structured to sense a temperature of the engine 12 in the system 100. In some embodiments, the temperatures sensor 102 is structured to measure the ambient temperature. In some embodiments, the temperature sensor 102 includes a thermocouple. In some embodiments, the temperature sensor 102 is mounted within or proximate the oil cooler and is configured to monitor the temperature of oil within the oil cooler of the engine 12. In some embodiments, the temperature sensor 102 includes an engine coolant temperature sensor that measures the temperature of the engine coolant and in turn, the system 100 is able to use that temperature measurement to determine a temperature of the engine. In other embodiments, the temperature sensor 102 includes a sensor located at or near the engine, or a component thereof to determine a temperature of the engine. In other embodiments, the temperature sensor 102 includes an ambient sensor located in the environment in which the engine is located to determine the ambient temperature of that environment.

The voltage sensor 104 is structured to measure the voltage output of the alternator 13. In one embodiment, the voltage across the battery 17 of the generator 10 is measured. In this regard, the voltage sensor 104 is communicably and operatively coupled to the battery 17 to detect the voltage across the battery 17. In some embodiments, the voltage sensor 104 includes a voltmeter. One lead is connected to one terminal on the battery 17 and another lead is connected to a second terminal on the battery 17 to determine the voltage across the battery 17. In another embodiment, the voltage at a starter solenoid is measured while the engine 12 is being cranked. In this regard, the voltage sensor 104 is communicably and operatively coupled to the starter solenoid to measure the output voltage.

The pressure sensor 106 is configured to sense an oil pressure of the engine 12 in the system 100. In one embodiment, the pressure sensor 106 includes a pressure gauge to detect the oil pressure. In some embodiments, the pressure sensor 106 is part of the OPS. In one embodiment, the pressure can be sensed while the engine 12 is cranking, but not yet started. In another embodiment, the pressure can be sensed while the engine 12 is running.

The exercise cycle management system 100 also includes a speed sensor 108. The speed sensor 108 is structured to detect an engine speed. In some embodiments, the speed sensor 108 receives an output from the alternator that corresponds to engine speed. The speed sensor 108 is communicably coupled to the alternator 13 of the engine 12, such that the output current of the alternator is detected, from which a corresponding engine speed is determined. Alternatively, engine speed can be measured directly at the engine 12 by an engine speed sensor. In this case, the engine speed can be measured at the starter solenoid when engaged.

Still referring to FIG. 3, the exercise cycle management system 100 also includes a throttle position sensor 110. The throttle position sensor 110 is structured to detect a position of the throttle 20 (e.g., percent open). In that regard, the throttle position sensor 110 is communicably and operatively coupled to the throttle 20 to detect a position of the throttle 20. In one embodiment, the throttle position sensor 110 is coupled to the throttle lever, such that the position of the throttle lever is detected, indicating a position of the throttle. In other embodiments, the throttle position sensor 110 may be coupled to any other component indicative of the throttle 20 position, such as a linkage between the governor 16 and the throttle 20.

In FIG. 3, the sensors are shown to attach to the generator 10, but may be attached to various specific locations of the engine 12 or other components. For example, the sensors may be attached to the housing, engine block, cylinder head, crank shaft, cylinder, cam shaft, valve cover, or other suitable location on the engine 12.

In other contemplated embodiments, more or less sensors can be included. The sensors may measure operating speed of the engine 12, rotations of the crank shaft of the engine 12, rotations of the cam shaft of the engine 12, operating time of the engine 12, oil temperature of the engine 12, air-to-fuel ratio of the engine 12, mass air flow of the engine 12, mass air pressure of the engine 12, and other suitable measurements of the engine 12. According to various embodiments, sensors may be thermocouples, air flow meters, flow sensors, mass air flow sensors, rotary encoders, tachometers, hall effect sensors, speedometers, manifold absolute pressure sensors, oxygen sensors, speed sensors, throttle position sensors, torque sensors, variable reluctance sensors, vehicle speed sensors, and other suitable sensors. The processing circuit may be configured to receive readings from the internal combustion engine sensors and/or ambient sensors and determine, among other calculations, an appropriate operation manner for the generator 10. For example, during exercise cycles in certain ambient temperatures, such as temperatures below 32° F. (0° C.), the exercise cycle may not run or may just crank the engine 12. At low temperatures, water condenses in the oil of the engine 12 because the engine 12 is not at a minimum temperature to evaporate the water. Running the engine 12 with water in the oil may cause damage to the engine 12. In this example, other benefits are present such as a decrease in noise pollution of the standby generator and an increase in the fuel efficiency of the standby generator because the generator was not required to run, or ran for a substantially shorter amount of time.

The exercise cycle management system 100 further includes a generator control system 18. As shown, the generator control system 18 includes a processing circuit 114, which may include a processor 116 and one or more memory devices 118. The processor 116 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 118 (e.g., RAM, NVRAM, ROM, Flash Memory, hard disk storage) may store data and/or computer code for facilitating the various processes described herein. Moreover, the one or more memory devices 118 may be or include tangible, non-transient volatile memory or non-volatile memory. Accordingly, the one or more memory devices 118 may include database components, object code components, script components, or any other type of information structure for supporting the various activities and information structures described herein.

The generator control system 18 further includes a tables database 140. The tables database 140 holds, stores, categorizes, and otherwise serves as a repository for the engine look-up tables corresponding to a time at which the engine should be shut down to prevent oxygen depletion. The tables database 140 stores values including, but not limited to, temperature, altitude, load, frequency, and throttle position that may be used to determine from which table the exercise control system 120 pulls and utilizes information. As an example, the tables database 140 stores value ranges for each parameter that is measured by the system 100. The measured values can be compared to the stored values in the tables database 140 to determine the health of that particular component of the generator 10.

The tables database 140 is structured to provide access to information relating to the sensed values of the engine. In this regard, the tables database 140 is communicably and operatively coupled to the exercise control system 120 to provide access to such information, such that the exercise control system 120 may perform a certain operation (e.g., start engine, crank engine, shut down unit, send notification, etc.) based on those values.

Figure 4:
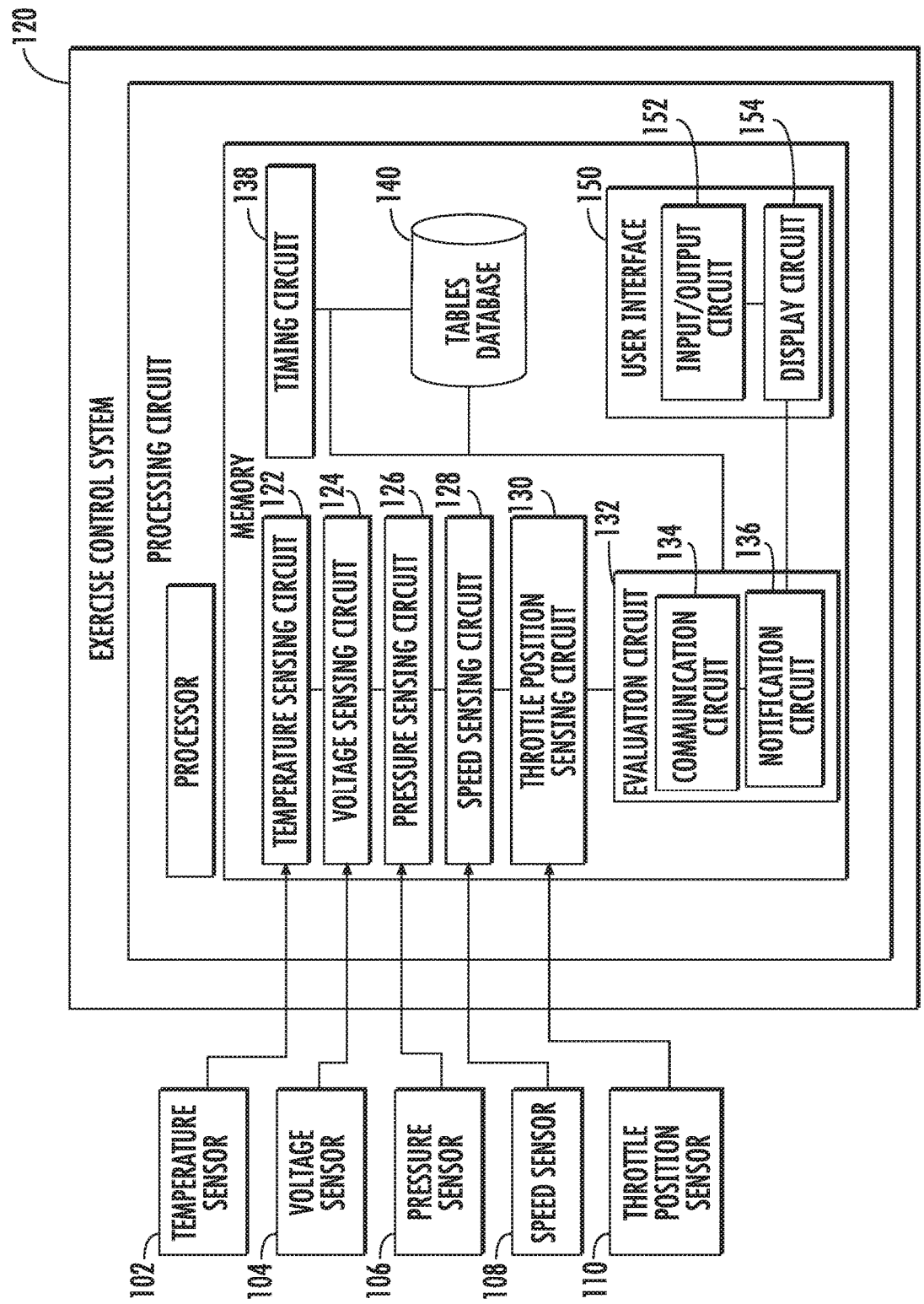
FIG. 4 is a schematic diagram of a generator control system of the exercise cycle management system of FIG. 3, according to an exemplary embodiment.

Referring now to FIG. 4, a diagram of an exercise control system 120 and part of the generator control system 18 of FIG. 2 are shown according to an exemplary embodiment. As mentioned above, the exercise control system 120 may be embodied with the generator control system 18. Accordingly, the exercise control system 120 may be embodied or at least partly embodied in the memory device 118, where at least some operations may be executable from the processing circuit 114. The exercise control system 120 is shown to include a temperature sensing circuit 122, voltage sensing circuit 124, pressure sensing circuit 126, speed sensing circuit 128, throttle position sensing circuit 130, evaluation circuit 132, timing circuit 138, and user interface 150, with all such circuits communicably coupled with each other. Other embodiments may include more or less circuits without departing from the spirit and scope of the present disclosure.

Each of the sensing circuits shown in FIG. 4 is structured to receive values from the corresponding sensors. The temperature sensing circuit 122 is structured to receive a value of engine temperature from the temperature sensor 102. The voltage sensing circuit 124 is structured to receive a value of generator output voltage from the voltage sensor 104. The pressure sensing circuit 126 is structured to receive a value of oil pressure from the pressure sensor 106. The speed sensing circuit 128 is structured to receive an engine speed value from the speed sensor 108. The throttle position sensing circuit 130 is structured to receive a detected value of a throttle position from the throttle position sensor 110. All of these values are used in the evaluation circuit 132 to determine the health of the generator 10 and the timing of running an exercise cycle, as described further herein.

The evaluation circuit 132 is structured to communicate with each of the temperature, voltage, pressure, speed, and throttle position sensing circuits and additionally communicate with the tables database 140 to determine whether to run an exercise cycle, what type of exercise cycle to run, and to determine whether the generator 10 is healthy or needs maintenance. In one embodiment, the evaluation circuit 132 determines whether to start the starter motor without starting the engine 12 or to start the engine 12 to check the health of the components of the generator 10.

As noted above, one factor in determining whether to run an exercise cycle can be ambient temperature. The temperature sensor 102 can determine an ambient temperature and communicate that value to the exercise control system 120 to determine whether to run an exercise cycle. During routine exercise cycles, standby generators typically run under no load and at maximum speed. These operating conditions can cause the fan to "overcool" the engine 12. Under an overcooled condition, the oil within the standby generator may not reach an optimal operating temperature. Overcooling may also lead to water being present within the oil system. During cold ambient temperatures (e.g., less than 40° F. (4.444° C.)), it may be desirable to not start the engine 12 of the standby generator 10 to avoid running with water in the oil system.

The voltage reading is used for various health checks of the generator 10. In one example, the voltage is used to determine the health of the battery 17. In this example, a voltage reading is taken before starting the generator and after starting the generator to determine the effect of running the generator on the voltage. As an example, if the voltage drops between the two readings, the generator likely needs maintenance and if the voltage stays the same or increases, the battery is likely functioning properly. The voltage reading additionally tests the recovery of the battery 17. As such, the voltage reading can measure the time it takes the battery 17 to recover back to a suitable voltage. In another example, the voltage reading is used to determine rotor/stator health of the generator. The rotor/stator generates voltage that can be read to be within a specific range for the particular generator to determine the health of the generator 10. Similarly, the voltage reading can be used to check generator sensing, which is related to the rotor/stator function. In yet another example, the voltage reading is used to determine the health of the voltage regulator, which is used to automatically maintain a constant output voltage level. When the generator 10 is started for a period of time (e.g., approximately 10 seconds), the output voltage can be monitored. In a further example, the voltage reading is used to check the brush function, field flash, and alternator buildup. In some cases, when residual magnetism is lost due to shelf time, improper operation, etc., the residual magnetism can be restored by a field flash. As a related matter, alternator buildup refers to when voltage is used to excite the field coils for the alternator to generate stronger voltage as part of its build up process. To test these functions, the output voltage is monitored based on the engine cranking RPM.

The pressure reading can be used to check the operation of the OPS in the system 100. The pressure value can be read without starting the engine. In some cases, the crank time for the engine needs to exceed 5 seconds for oil to build up to actuate the OPS. Additional time is needed for lubrication of bearings and other components.

The throttle position reading can be used to check the operation of the governor of the engine 12. In one embodiment, the throttle position reading is taken while the engine 12 is running to test the opening and closing of the throttle under various loads and/or engine speeds. In this regard, the throttle position sensing circuit 130 is communicably coupled to the speed sensing circuit 128 to determine the governor functionality.

For each set and/or combination of generator and/or engine conditions, a different look-up table may be generated and stored in the tables database 140 for access during operation. Additionally, user input into the user interface 150 may provide some of this information. In one embodiment, the user input may be provided by a user operating the engine and/or generator. In another embodiment, the user input may be preset, as indicated above, by the manufacturer of the engine and/or generator. User input may include conditions such as altitude, where the conditions are not going to change with changes in the engine operation.

To determine which information to pull and use from the tables database 140, the evaluation circuit 132 uses the values received by each of the sensing circuits (e.g., temperature sensing circuit 122, voltage sensing circuit 124, pressure sensing circuit 126, speed sensing circuit 128, and throttle position sensing circuit 130). In this regard, in one embodiment, the evaluation circuit 132 includes a communication circuit 134 to receive temperature, voltage, pressure, speed, and throttle position values from the engine 12 and use those values to make a determination regarding the exercise cycles and health of the generator 10. The evaluation circuit 132 may additionally be structured to communicate with the user interface 150 to notify a user when an exercise cycle is scheduled, has been performed, or when the generator 10 is experiencing maintenance issues. For example, if during an exercise cycle the evaluation circuit 132 determines that the voltage across the battery is dropping excessively while the generator 10 is running, the evaluation circuit 132 may communicate with the user interface 150 that maintenance is required. In this regard, the evaluation circuit 132 may include notification circuit 136 to generate a message for display on the user interface 150. The notification circuit 136 can generate a message for display on the user interface 150. As such, the notification circuit 136 is communicably and operatively coupled to the display circuit 154 of the user interface 150.

The timing circuit 138 is structured to determine the schedule, type, and duration of exercise cycles. The timing circuit 138 is structured to receive information from the evaluation circuit 132 and user input from the user interface 150 to make a determination regarding the schedule, type, and duration of exercise cycles. In this regard, the timing circuit 138 is communicably and operatively coupled to the evaluation circuit 132 and the user interface 150. In some embodiments, a user can override the set schedule, type, or duration of exercise cycles by inputting information into the user interface as described further herein. In other embodiments, the user cannot override the exercise cycle operation.

Different types of exercise cycles can be run during the life of the generator 10. In one example, the exercise cycle can be running the generator 10 for approximately twenty minutes at no load. In another example, the exercise cycle can be running the generator 10 for less than twenty minutes. In another example, the exercise cycle can be running the generator 10 for more than twenty minutes. In another example, the exercise cycle can be cranking the engine without starting for approximately 5-15 seconds. In another example, the exercise cycle can be cranking the engine without starting for more than 15 seconds. In some embodiments, when the engine has not been started for a period of time (e.g., several weeks, months, etc.), the timing circuit 138 can determine that the engine needs to be started at the next scheduled exercise cycle. Scheduled exercise cycles can be skipped for various reasons, such as ambient temperature, user input, etc. The evaluation circuit 132 can determine the schedule for exercise cycle runs to be according to any time frame including, but not limited to, weekly, bi-weekly, monthly, bi-monthly, quarterly, or based upon other factors such as ambient temperature, user input, and so on. In some embodiments, if an exercise cycle is skipped, the evaluation circuit 132 can schedule a new exercise cycle at any time. As an example, the evaluation circuit 132 can monitor the ambient temperature and once the temperature reaches above a certain value (e.g., 32° F. (0° C.)); the system 100 can immediately run an exercise cycle. Any combination of factors can be used by the evaluation circuit 132 to determine the timing and method of running exercise cycles.

The user interface 150 includes a display circuit 154, and an input/output circuit 152. The display circuit 154 is used to present maintenance information, exercise cycle timing information, and the like to users on the user interface 150. In this regard, the display circuit 154 is communicably and operatively coupled to the input/output circuit 152 to provide a user interface for receiving and displaying information on the generator 10.

The input/output circuit 152 is structured to receive and provide communication(s) to a user (e.g., a dealer, a consumer) of the generator 10. In this regard, the input/output circuit 152 is structured to exchange data, communications, instructions, etc. with an input/output component of the generator 10. Accordingly, in one embodiment, the input/output circuit 152 includes an input/output device such as a display device, a touchscreen, a keyboard, and a microphone. In another embodiment, the input/output circuit 152 may include communication circuitry for facilitating the exchange of data, values, messages, and the like between an input/output device and the components of the generator 10. In yet another embodiment, the input/output circuit 152 may include machine-readable media for facilitating the exchange of information between the input/output device and the components of the generator 10. In still another embodiment, the input/output circuit 152 may include any combination of hardware components (e.g., a touchscreen), communication circuitry, and machine-readable media.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server).

To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method of exercising a generator, comprising:
    detecting a temperature of the generator by a temperature sensor;
    if the temperature of the generator is above a predetermined temperature, activating, by a controller, a starter motor of the generator, and performing, by the controller, an exercise test; and
    if the temperature of the generator is below the predetermined temperature, not activating, by the controller, the starter motor.

2. The method of claim 1, wherein the predetermined temperature is a first predetermined temperature, the method further comprising:
    if the temperature of the generator is above a second predetermined temperature, the exercise test is a first exercise test; and
    activating, by a controller, a starter motor and starting an engine of the generator, and performing, by the controller, the first exercise test.

3. The method of claim 2, wherein the first exercise test comprises:
    opening the fuel valve of the engine after a predetermined time period; and
    checking voltage drop and battery recover to verify health of a battery.

4. The method of claim 3, wherein the first exercise test further comprises:
    verifying that the engine has started;
    deactivating the starter motor;
    starting engine run timing; and
    stopping the engine.

5. The method of claim 1, wherein the predetermined temperature is a first predetermined temperature, the method further comprising:
    if the temperature of the generator is above the first predetermined temperature and below the second predetermined temperature, the exercise test is a second exercise test; and
    activating, by a controller, a starter motor without starting the engine, and performing by the controller, the second exercise test.

6. The method of claim 5, wherein the second exercise test further comprises:
    closing a fuel solenoid of the engine before activating the starter motor;
    checking the voltage drop and battery recovery to verify health of a battery; and
    verifying a cranking speed of the engine.

7. The method of claim 1, further comprising:
    checking an exercise run schedule of the generator;
    if the temperature of the generator is below the predetermined temperature and an exercise cycle is scheduled, cancelling, by the controller, the exercise cycle.

8. The method of claim 1, further comprising:
    checking an exercise run schedule of the generator;

if the temperature of the generator is below the predetermined temperature and an exercise cycle is scheduled, delay activating, by the controller, the starter motor until the temperature is above the predetermined temperature.

9. A method of exercising a generator, comprising:
detecting a temperature of the generator by a temperature sensor;
if the temperature of the generator is below a first predetermined temperature, not activating, by the controller, the starter motor;
if the temperature of the generator is above a second predetermined temperature, activating, by a controller, a starter motor and starting an engine of the generator, and performing, by the controller, a first exercise test; and
if the temperature of the generator is above the first predetermined temperature and below the second predetermined temperature, activating, by the controller, the starter motor without starting the engine, and performing, by the controller, a second exercise test.

10. The method of claim 9, wherein the first exercise test comprises:
opening the fuel valve of the engine after a predetermined time period;
checking voltage drop and battery recover to verify health of a battery;
verifying that the engine has started;
deactivating the starter motor;
starting engine run timing; and
stopping the engine.

11. The method of claim 9, wherein the second exercise test comprises:
closing a fuel solenoid of the engine before activating the starter motor;
checking the voltage drop and battery recovery to verify health of a battery; and
verifying a cranking speed of the engine.

12. The method of claim 9, further comprising:
checking an exercise run schedule of the generator;
if the temperature of the generator is below the first predetermined temperature and an exercise cycle is scheduled, cancelling, by the controller, the exercise cycle.

13. The method of claim 9, further comprising:
checking an exercise run schedule of the generator;
if the temperature of the generator is below the first predetermined temperature and an exercise cycle is scheduled, delay activating, by the controller, the starter motor until the temperature is above the first predetermined temperature.

14. A generator comprising:
an engine including a crankshaft;
a fuel valve configured to control a flow of fuel to the engine;
a starter motor configured to rotate the crankshaft;
an alternator driven by the engine;
a temperature sensor; and
a controller programmed to:
read the temperature sensor;
if a temperature reading of the generator is above a predetermined temperature reading, actuating the starter motor and perform a test;
if the temperature reading of the generator is below the predetermined temperature reading, not actuating the starter motor.

15. The generator of claim 14, wherein the test is a first test comprising:
opening the fuel valve of the engine after a predetermined time period;
checking voltage drop and battery recover to verify health of a battery;
verifying that the engine has started;
stopping cranking of the starter motor;
starting engine run timing; and
stopping the engine.

16. The generator of claim 14, wherein, the first test further comprises:
accessing a pass-fail status;
if the generator has passed the first test, ending the first test; and
if the generator has failed the first test, displaying a failure notification.

17. The generator of claim 14, wherein the test is a second test comprising:
closing a fuel solenoid of the engine;
cranking the starter motor;
checking the voltage drop and battery recovery to verify health of a battery; and
verifying a cranking speed of the engine.

18. The generator of claim 14, wherein the second test further comprises:
accessing a pass-fail status;
if the generator has passed the second test, ending the second test; and
if the generator has failed the second test; displaying a failure notification.

19. The generator of claim 14, wherein the controller is further programmed to:
check an exercise run schedule of the generator;
if the temperature reading is below the first predetermined temperature reading and an exercise cycle is schedule, cancel the exercise cycle.

20. The generator of claim 14, wherein the controller is further programmed to:
check an exercise run schedule of the generator;
if the temperature reading is below the first predetermined temperature reading and an exercise cycle is schedule, delay actuating the starter motor until the temperature reading is above the first predetermined temperature reading.

* * * * *